US011994866B2

(12) United States Patent
Philbin et al.

(10) Patent No.: US 11,994,866 B2
(45) Date of Patent: May 28, 2024

(54) COLLISION AVOIDANCE PERCEPTION SYSTEM

(71) Applicant: Zoox, Inc., Foster City, CA (US)

(72) Inventors: James William Vaisey Philbin, Palo Alto, CA (US); Cooper Stokes Sloan, San Francisco, CA (US); Noureldin Ehab Hendy, West Lafayette, IN (US); Nicholas George Charchut, Santa Monica, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 447 days.

(21) Appl. No.: 16/591,518

(22) Filed: Oct. 2, 2019

(65) Prior Publication Data

US 2021/0103285 A1 Apr. 8, 2021

(51) Int. Cl.
*G05D 1/02* (2020.01)
*B60W 30/095* (2012.01)
*B60W 50/00* (2006.01)
*G05D 1/00* (2006.01)

(52) U.S. Cl.
CPC ....... *G05D 1/0214* (2013.01); *B60W 30/0956* (2013.01); *B60W 50/0097* (2013.01); *G05D 1/0088* (2013.01); *B60W 2400/00* (2013.01); *B60W 2554/80* (2020.02); *G05D 2201/0213* (2013.01)

(58) Field of Classification Search
None
See application file for complete search history.

(56) References Cited

U.S. PATENT DOCUMENTS

| 10,553,117 | B1 * | 2/2020 | Johnson | B60W 30/0956 |
| 10,678,246 | B1 | 6/2020 | Warshauer-Baker et al. | |
| 11,016,491 | B1 | 5/2021 | Millard | |
| 2017/0123429 | A1 | 5/2017 | Levinson et al. | |
| 2017/0124476 | A1 | 5/2017 | Levinson et al. | |
| 2018/0345958 | A1 * | 12/2018 | Lo | G08G 1/166 |
| 2019/0072965 | A1 * | 3/2019 | Zhang | G08G 1/161 |
| 2019/0113927 | A1 * | 4/2019 | England | G05D 1/0231 |

(Continued)

FOREIGN PATENT DOCUMENTS

EP 2952993 A1 * 12/2015 ............. G01S 15/89

OTHER PUBLICATIONS

Elmenreich, "Constructing Dependable Certainty Grids from Unreliable Sensor Data", 2008, Elsevier, pp. 1-8 (Year: 2008).*

(Continued)

*Primary Examiner* — Jelani A Smith
*Assistant Examiner* — Davin Seol
(74) *Attorney, Agent, or Firm* — Lee & Hayes, P.C.

(57) ABSTRACT

A collision avoidance system may validate, reject, or replace a trajectory generated to control a vehicle. The collision avoidance system may comprise a secondary perception component that may receive sensor data, receive and/or determine a corridor associated with operation of a vehicle, classify a portion of the sensor data associated with the corridor as either ground or an object, determine a position and/or velocity of at least the nearest object, determine a threshold distance associated with the vehicle, and control the vehicle based at least in part on the position and/or velocity of the nearest object and the threshold distance.

20 Claims, 5 Drawing Sheets

(56) References Cited

U.S. PATENT DOCUMENTS

| | | | |
|---|---|---|---|
| 2019/0235520 A1 | 8/2019 | Parchami et al. | |
| 2019/0243371 A1 | 8/2019 | Nister et al. | |
| 2020/0148215 A1 | 5/2020 | Mohajerin et al. | |
| 2020/0160559 A1* | 5/2020 | Urtasun | G06K 9/629 |
| 2020/0257931 A1 | 8/2020 | Yershov et al. | |
| 2020/0363809 A1* | 11/2020 | Leßmann | B60W 30/09 |
| 2020/0365029 A1 | 11/2020 | Kourous-Harrigan et al. | |
| 2020/0377108 A1* | 12/2020 | Balazs | G06N 3/0454 |
| 2021/0004012 A1* | 1/2021 | Marchetti-Bowick | G05D 1/0088 |
| 2021/0026355 A1 | 1/2021 | Chen et al. | |
| 2021/0046954 A1* | 2/2021 | Haynes | G06N 7/005 |
| 2021/0056712 A1 | 2/2021 | Daudelin et al. | |
| 2021/0064040 A1* | 3/2021 | Yadmellat | G05D 1/0214 |
| 2021/0064890 A1* | 3/2021 | Murveit | B60W 30/18159 |
| 2021/0101624 A1 | 4/2021 | Philbin et al. | |
| 2021/0110193 A1* | 4/2021 | Green | G06V 40/20 |
| 2021/0131823 A1* | 5/2021 | Giorgio | G05D 1/0214 |
| 2022/0129726 A1 | 4/2022 | Marina | |

OTHER PUBLICATIONS

Badrinarayanan et al.; SegNet: A Deep Convolutional Encoder-Decoder Architecture for Image Segmentation, arXiv: 1511.00561v3 [cs.CV]; Oct. 10, 2016; available at <<<https://arxiv.org/abs/1511.00561>>>.

Caesar et al.; nuScenes: A Multimodal Dataset for Autonomous Driving; May 5, 2020; nuTonomy: an APTIV Company; Available at <<<https://arxiv.org/pdf/1903.11027.pdf>>>.

Dequaire, Julie & Rao, Dushyant & Ondruska, Peter & Wang, Dominic & Posner, Ingmar. (2016). Deep Tracking on the Move: Learning to Track the World from a Moving Vehicle using Recurrent Neural Networks. Mobile Robotics Group at the University of Oxford, United Kingdom. Retrieved from <<<https://arxiv.org/pdf/1609.09365.pdf>>>.

Hoyer et al.; Short Term Prediction and Multi-Camera Fusion on Semantic Grids; arXiv:1903.08960v2 [cs.CV] ,Jul. 26, 2019; available at <<<https://arxiv.org/abs/1903.08960>>>.

Kingma et al.; Adam: A Method for Stochastic Optimization; Published as a Conference Paper at ICLR 2015; Available at <<<https://arxiv.org/pdf/1412.6980.pdf>>>.

Long et al.; Fully Convolutional Networks for Semantic Segmentation, arXiv:1411.4038v2 ,Mar. 8, 2015; available at <<<https://arxiv.org/abs/1411.4038>>>.

Lu et al.; Monocular Semantic Occupancy Grid Mapping with Convolutional Variational Encoder-Decoder Networks; Dec. 31, 2018; Available at <<<https://arxiv.org/pdf/1804.02176.pdf>>>.

Mohajerin et al.; Multi-Step Prediction of Occupancy Grid Maps with Recurrent Neural Networks; ariv:1812.09395v3 [cs.LG] Jan. 22, 2019; available at <<<http://arxiv.org/pdf/1812.09395.pdf>>>.

Office Action for U.S. Appl. No. 16/848,834, dated Dec. 10, 2021, Phillbin, "Collision Avoidance Perception System", 11 Pages.

Palazzi et al., Learning to Map Vehicles into Bird's Eye View, arXiv:1706.08442v1 [cs.CV], Jun. 26, 2017; available at <<<https://arxiv.org/abs/1706.08442>>>.

Pan et al.; Cross-View Semantic Segmentation for Sensing Surroundings; Jun. 18, 2020; IEEE Robotics and Automation Letters; Preprint Version; Accepted Jun. 2020; Available at <<<http://arxiv.org/pdf/1906.03560.pdf>>>.

Pendleton et al.; Perception, Planning, Control, and Coordination for Autonomous Vehicles; Published Feb. 17, 2017; MDPI; Available at <<<https://www.semanticscholar.org/paper/Perception%2C-Planning%2C-Control%2C-and-Coordination-for-Pendleton-Andersen/eb26de17a463dfe6fa655ef1362dfd46e86fda23>>>.

R. Prophet, G. Li, C. Sturm and M. Vossiek, "Semantic Segmentation on Automotive Radar Maps," 2019 IEEE Intelligent Vehicles Symposium (IV), 2019, pp. 756-763, doi: 10.1109/IVS.2019.8813808.

Roddick et al.; Orthographic Feature Transform for Monocular 3D Object Detection; Nov. 20, 2018; Available at <<<https://arxiv.org/pdf/1811.08188.pdf>>>.

Ronneberger et al., U-Net: Convolutional Networks for Biomedical Image Segmentation; May 18, 2015, Available at <<<https://arxiv.org/pdf/1505.04597.pdf>>>.

Shreiber et al.; Long-Term Occupancy Grid Prediction Using Recurrent Neural Networks; arXiv:1809.03782v2 [cs.CV], Jun. 7, 2019; available at <<<http://arxiv.org/pdf/1809.03782.pdf>>>.

Zhao et al., Pyramid Scene Parsing Network; Apr. 27, 2017; Available at <<<http://arxiv.org/pdf/1612.01105.pdf>>>.

The International Preliminary Report on Patentability for PCT Application No. PCT/US20/53558, dated Apr. 14, 2022.

Office Action for U.S. Appl. No. 16/848,834, dated Jul. 20, 2022, Philbin, "Collision Avoidance Perception System", 33 pages.

Office Action for U.S. Appl. No. 16/848,834, dated Dec. 12, 2022, Philbin, "Collision Avoidance Perception System", 34 pages.

* cited by examiner

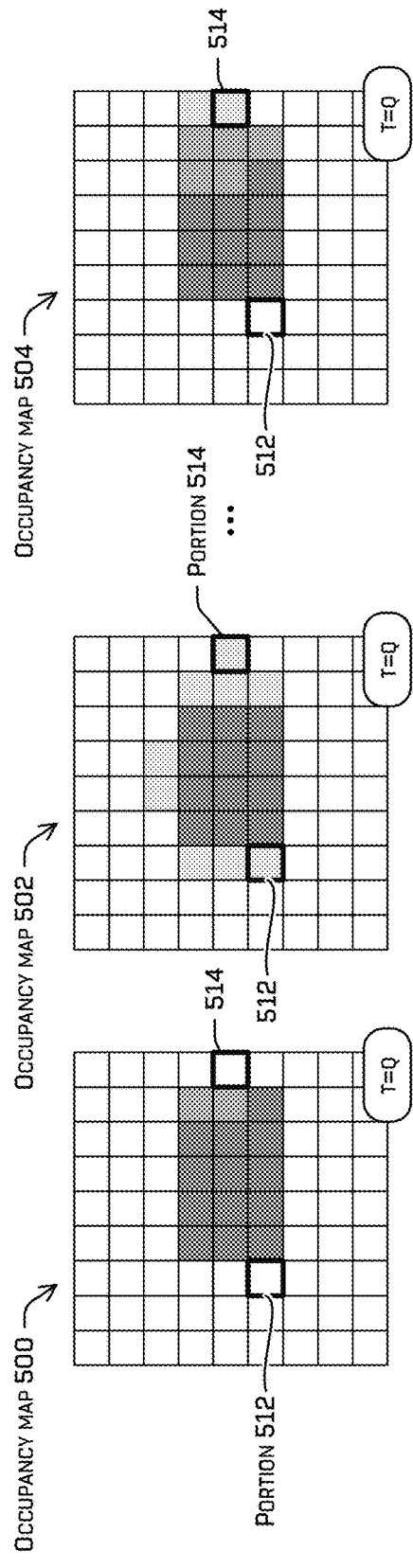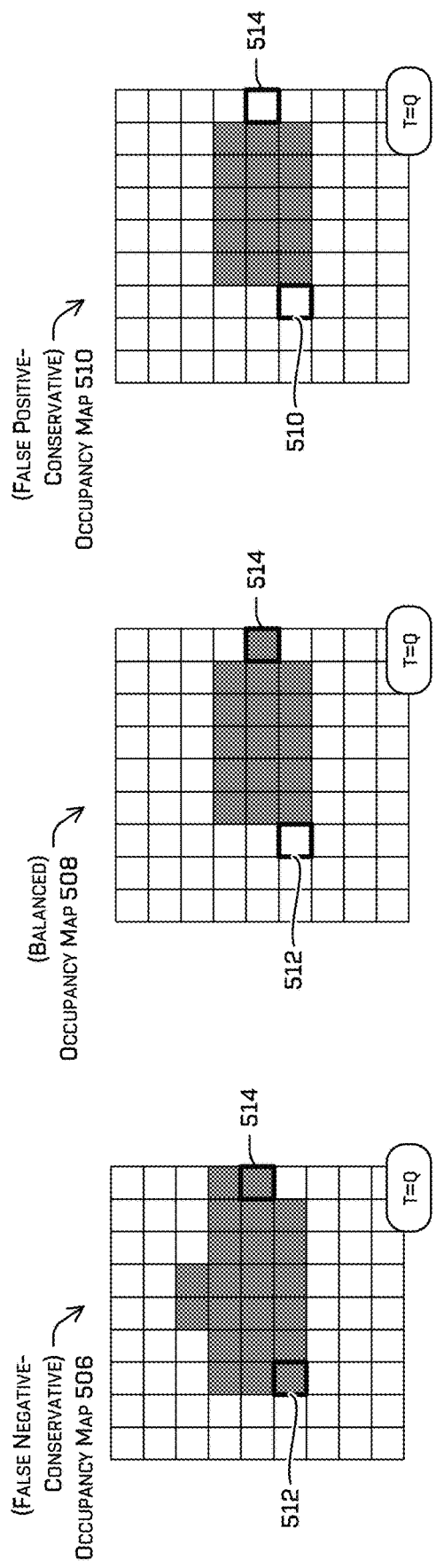

COLLISION AVOIDANCE PERCEPTION SYSTEM

BACKGROUND

Safety of passengers in a vehicle and other people or objects in proximity to the vehicle is of the upmost importance. Such safety is often predicated on an accurate detection of a potential collision and timely deployment of a safety measure. To safely operate, an autonomous vehicle may include multiple sensors and various systems for detecting and tracking events surrounding the autonomous vehicle and may take these events into account when controlling the autonomous vehicle. For example, the autonomous vehicle may detect and track every object within a 360-degree view of a set of cameras, LIDAR sensors, radar, and/or the like to control the autonomous vehicle safely.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 5A illustrates example occupancy maps determined for sensor data received from different sensor types.

FIGS. 5B-5D illustrate different example data structures that may result by aggregating the example occupancy maps of FIG. 5A according to different techniques.

DETAILED DESCRIPTION

Figure 1:
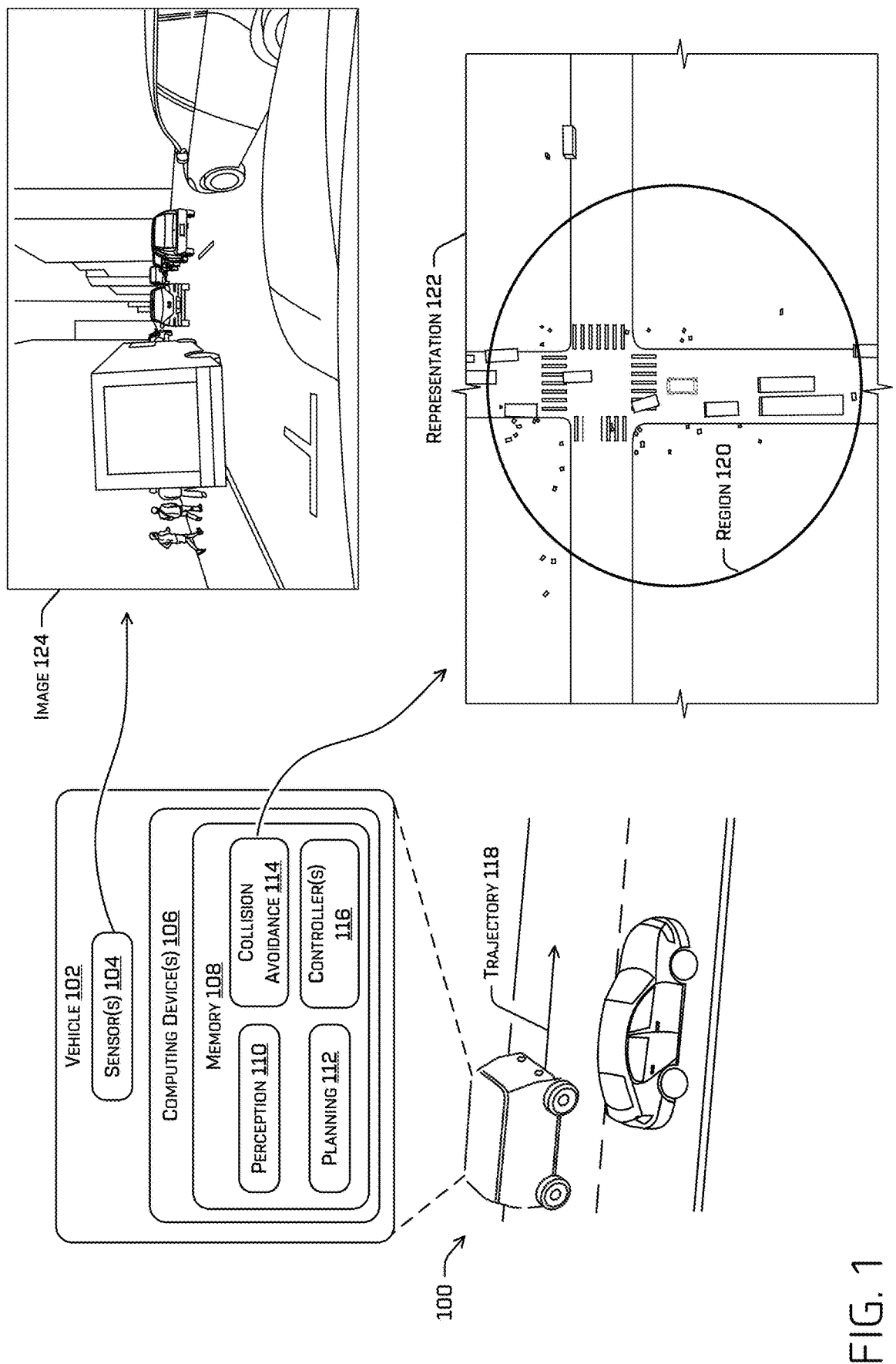
FIG. 1 illustrates an example scenario in which an autonomous vehicle configured with a collision avoidance component may generate a trajectory for controlling the autonomous vehicle and determine, by the collision avoidance component, whether to implement the trajectory or cause the autonomous vehicle to perform a contingent trajectory, such as a safe stop, braking, or hard braking.

Techniques for collision avoidance may comprise a collision avoidance system that validates, rejects, or replaces a trajectory generated to control a vehicle. For example, upon validating a trajectory according to the techniques discussed herein, the collision avoidance system may pass or otherwise allow the trajectory to be implemented by the vehicle. However, upon determining that the trajectory is invalid, according to the techniques discussed herein, the collision avoidance system may cause the vehicle to initiate an alternative maneuver (e.g., a safe stop maneuver, a contingent trajectory) and/or re-determine a new trajectory. In some examples, a planning component of the vehicle may determine the trajectory based at least in part on sensor data, map data, localization data (e.g., where the autonomous vehicle is/how the autonomous vehicle is oriented relative to objects in the environment, mapped locations, and/or the like), and/or perception data (e.g., what is in the environment, characteristics of objects in the environment) received from a primary perception component.

The collision avoidance system may comprise a secondary perception component and/or validation component. For example, the collision avoidance system may receive the trajectory and receive, from one or more sensors, sensor data associated with an environment surrounding the autonomous vehicle. In some examples, while the primary perception component may determine the perception data based at least in part on all or near all of the sensor data, the secondary perception component of the collision avoidance system may determine whether or not to reject the trajectory based at least in part on a subset of the sensor data used by the primary perception component. In at least some examples, such a secondary perception system may further use similar and/or dissimilar hardware and or software with respect to the primary system. In some examples, the secondary perception system may simply classify sensor data as a static object or a dynamic object, without disambiguating what type of object. In additional or alternate examples, the secondary perception system may comprise an ML model of any type, configured to disambiguate classifications of objects.

In some examples, the secondary perception system may comprise multiple machine-learning (ML) models associated with different sensor types. The secondary perception system may receive first sensor data associated with a first sensor type and second sensor data associated with a second sensor type. A first ML model may be trained to determine a first occupancy map based at least in part on the first sensor data (of the first sensor type) and a second ML model may be trained to determine a second occupancy map based at least in part on the second sensor data. An occupancy map may comprise a confidence score associated with a portion of the environment, the confidence score indicating a likelihood (e.g., a posterior probability) that the portion of the environment is or is predicted to be occupied by an object. In some examples, a portion of the occupancy map (e.g., a pixel, some other discrete portion) associated with the portion of the environment may additionally or alternatively indicate that an object is static or dynamic.

In some examples, the techniques may comprise training the ML models discussed herein such that the occupancy maps output thereby are associated with a same reference frame and/or dimensions. For example, the occupancy maps output by each of the ML models may be associated with a thirty-meter by thirty-meter square, centered at the autonomous vehicle and oriented as a top-down view of the environment and/or objects surrounding the autonomous vehicle.

The ML model(s) discussed herein may additionally or alternatively be trained output one or more occupancy maps associated with a current time and/or future time(s). For example, an ML model may trained to output a current occupancy map associated with a current time and a predicted occupancy map associated with a future time. Note that, as used herein, a "current" time may be associated with a time at which the sensor data was received, which will, in fact, be a past time by the time a current occupancy map associated therewith is generated by an ML model. The "current" time may therefore be associated with a time at which the sensor data was received or the "current" time may be associated with a time subsequent thereto (i.e., a future time). In the latter case, the current occupancy map may itself be a predicted occupancy map. In some examples, the ML model may receive previous sensor data in addition to current (most-recent) sensor data.

To give a summary example, a group of ML models may be trained to receive different sensor data types and generate a same number of occupancy maps, each of which may be associated with same respective times, e.g., from a current time up to a future time. For example, an ML model may determine occupancy maps at intervals from a current time up until a future time (e.g., five occupancies maps from 0 to 2 seconds, at intervals of 500 milliseconds, referenced from a time at which the most-recent sensor data was received).

The techniques may additionally or alternatively comprise aggregating the occupancy maps generated by the different ML models into a data structure. The aggregating may comprise aggregating occupancy maps associated with a same time into a single occupancy map. For example, different ML models may generate a first set of different occupancy maps all associated with a first future time and a second set of different occupancy maps all associated with a second future time. The aggregating may comprise aggregating the first set into a first occupancy map associated with the first future time and aggregating the second set into a second occupancy map associated with the second future time.

In additional or alternative techniques, a threshold may be applied to the occupancy maps before they are aggregated or to the data structure after the occupancy maps are aggregated. The threshold may be a threshold confidence score (e.g., a threshold posterior probability) and applying the threshold may comprise associating a portion of an occupancy map with an indication that a portion of the environment is occupied if a threshold score associated with the portion of the occupancy map meets or exceeds the threshold confidence score, or vice versa if the confidence score does not meet the threshold confidence level (i.e., the portion of the occupancy map may be associated with an indication that the portion of the environment is unoccupied).

In some instances, the aggregating may comprise an ensemble voting technique, wherein aggregating a set of occupancy maps into a data structure may comprise determining to populate a portion of the data structure with an indication that a portion of the environment is (or isn't) occupied with an object based at least in part on a majority voting between corresponding portions of the one or more occupancy maps associated with a same time, Bayesian average or other form of averaging (and applying a threshold to the average), maximum posterior probability (e.g., populating the portion of the data structure with a same indication as an occupancy map that indicates a highest posterior probability), and/or the like.

The techniques may additionally or alternatively comprise determining a threshold distance based at least in part on a velocity associated with the trajectory. For example, the threshold distance may be a stopping distance estimate associated with the vehicle at the current speed of the vehicle and/or at the velocity specified by the trajectory, given the environmental conditions (e.g., gradient, static coefficient associated with roadway and/or roadway condition). The validation component of the collision avoidance system may determine whether any sensor data classified as an object is or is predicted to be at a distance from the vehicle that is less than the threshold distance or whether a furthest point classified as ground is less than the threshold distance. In either case, the validation component may cause the vehicle to execute a contingent trajectory and/or to re-determine a trajectory based at least in part on determining that an object or the furthest detected ground is within the threshold distance of the vehicle. If the validation component determines that the nearest object is at a distance beyond the threshold distance and the furthest sensor data classified as ground is at a distance beyond the threshold distance, the validation component may validate the trajectory, which may comprise transmitting the trajectory to system controller(s) that may generate signals for actuating drive components of the vehicle to track the trajectory.

Additionally or alternatively, the validation component may determine whether to validate the trajectory or initiate an alternate maneuver based at least in part on a current velocity of the vehicle, a velocity associated with the trajectory, a velocity associated with an object, a current pose of the vehicle, and/or determining whether the sensor data associated with the object and/or ground classification is valid. For example, the techniques may comprise determining whether a current velocity, steering angle, steering rate, and/or heading of the vehicle comports (is within a respective threshold) with a velocity, steering angle, steering rate, and/or heading indicated by the trajectory.

The techniques discussed herein may improve the safety of a vehicle by preventing invalid or risky trajectories from being implemented by the vehicle. In at least some examples, such techniques may further prevent collisions due to providing redundancy in such a way as to mitigate errors in any system or subsystem associated with the trajectory generation components (perception, prediction, planning, etc.). Moreover, the techniques may reduce the amount of computational bandwidth, memory, and/or power consumed for collision avoidance in comparison to former techniques. The accuracy of the collision avoidance system may also be higher than an accuracy of the primary perception system, thereby reducing an overall error rate of trajectories implemented by the autonomous vehicle by filtering out invalid trajectories.

EXAMPLE SCENARIO

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a collision avoidance component 114, and/or system controller(s) 116. Although depicted in FIG. 1 for illustrative purposes, it should be understood that the collision avoidance component 114 may reside in/on a separate computing device (or otherwise) than any one or more of the other components. In some examples, the perception component 110 may be a primary perception component among other perception components, such as a secondary perception component that may be part of collision avoidance component 114. In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or the like. The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. The perception component 110, the planning component 112, and/or the collision avoidance component 114 may include one or more machine-learned (ML) models and/or other computer-executable instructions.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once the perception component 110 has generated perception data, the perception component 110 may provide the perception data to the planning component 112.

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise LIDAR and/or radar data, which the perception component 110 may receive as input. The perception component 110 may be configured to detect as many objects and information about the environment as possible to avoid failing to account for an event or object behavior that should be taken into account by the planning component 112 in determining the trajectory 118.

By contrast, the collision avoidance component 114 may monitor a region 120 that may be less than the entire region within an effective range of the sensor(s) 104. The collision avoidance component 114 may determine a subset of the sensor data associated with the region 120 and conduct the operations discussed herein based at least in part on the subset. For example, in the example scenario, the collision avoidance component 114 may determine a subset that comprises sensor data that includes the portion of the environment indicated by region 120, which may comprise a part of the representation 122. Although, in additional or alternate examples, the collision avoidance component 114 may monitor the same region as the perception component 110.

Collision avoidance component 114 may monitor sensor data associated with the region 120 to ensure the trajectory 118 will not or is not likely to result in a collision. In some examples, this may comprise receiving sensor data, such as image 124, and generating a top-down representation of the environment and the objects therein, as discussed in more detail herein. The collision avoidance component 114 may comprise a secondary perception component that generates a top-down representation of the environment and classify portions thereof as being occupied or unoccupied. In some examples, the collision avoidance component 114 may additionally or alternatively determine whether an occupied portion is dynamic or static.

The collision avoidance component 114 may additionally or alternatively comprise a validation component that may determine the threshold distance discussed herein and/or determine whether to validate or reject the trajectory 118. Validating the trajectory 118 may comprise transmitting the trajectory 118 to the controller(s) 116 (e.g., the validation component may comprise a multiplexer, one or more transistors configured as a switch that passes the trajectory 118 upon receiving a signal from the validation component, and/or the like that may provide a signal that allows the trajectory 118 signal to pass to the controller(s) 116). Rejecting the trajectory 118 may comprise transmitting a message to the planning component 112 to initiate re-determining a trajectory and/or initiating an alternate maneuver, such as a safe stop maneuver (e.g., emergency braking, pull over and park) and/or a contingent trajectory that may be received from the planning component 112 in addition to the trajectory 118 and/or stored in the memory 108. In some examples, the collision avoidance 114 may determine that at least a portion of the subset of the sensor data is valid or invalid based at least in part on an orientation of the sensors and/or a topology of the environment and/or a lower and upper bound of a valid portion of the sensor data, as discussed in more detail herein.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

EXAMPLE SYSTEM

Figure 2:
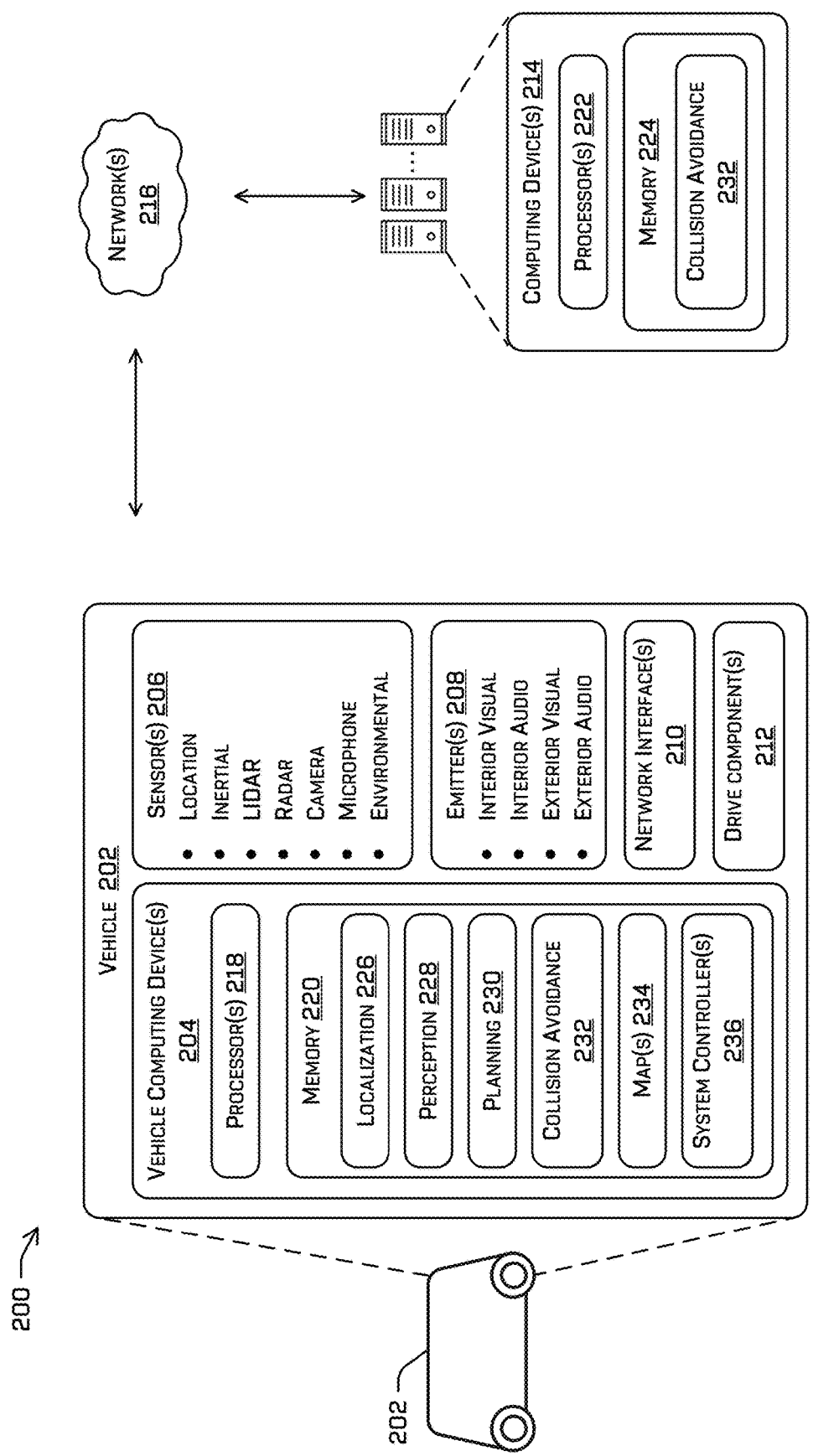
FIG. 2 illustrates a block diagram of an example system comprising a collision avoidance component.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, collision avoidance component 332, map(s) 234, and/or system controller(s) 236. Perception component 228 may represent perception component 110, planning component 230 may represent planning component 112, and/or collision avoidance component 332 may represent collision avoidance component 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the collision avoidance component 332, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The collision avoidance component 232 may operate on the vehicle 202 and/or on the computing device(s) 214. In some examples, the collision avoidance component 232 may be downstream (receive an output) from the planning component 230 in a pipeline. The collision avoidance component 332 may be configured to pass all, part, or none of the output of the planning component 230, depending on the determinations discussed herein, to system controller(s) 236 for implementation. In some examples, the collision avoidance component 232 may comprise a feedback loop for providing input to the planning component 230, such as a flag or message that triggers re-determination of a trajectory.

The memory 220 and/or 224 may additionally or alternatively store a mapping system (e.g., generating a map based at least in part on sensor data), a planning system, a ride management system, etc. Although localization component 226, perception component 228, planning component 230, collision avoidance component 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, and/or other components of the system 200 may comprise one or more ML models. For example, the localization component 226, the perception component 228, and/or the planning component 230 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, which the collision avoidance component 332 may validate and/or transmit to the system controller(s) 236. The system controller(s) 236 may control operation of the vehicle 202 based at least in part on the instructions received from the planning component 230 and/or collision avoidance component 332. In some examples, the collision avoidance component 332 may replace instructions generated by the planning component 230 with a contingent trajectory associated with an alternate maneuver such as, for example, a safe stop maneuver, emergency braking, slowing the vehicle, and/or the like.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

EXAMPLE ARCHITECTURE

Figure 3:
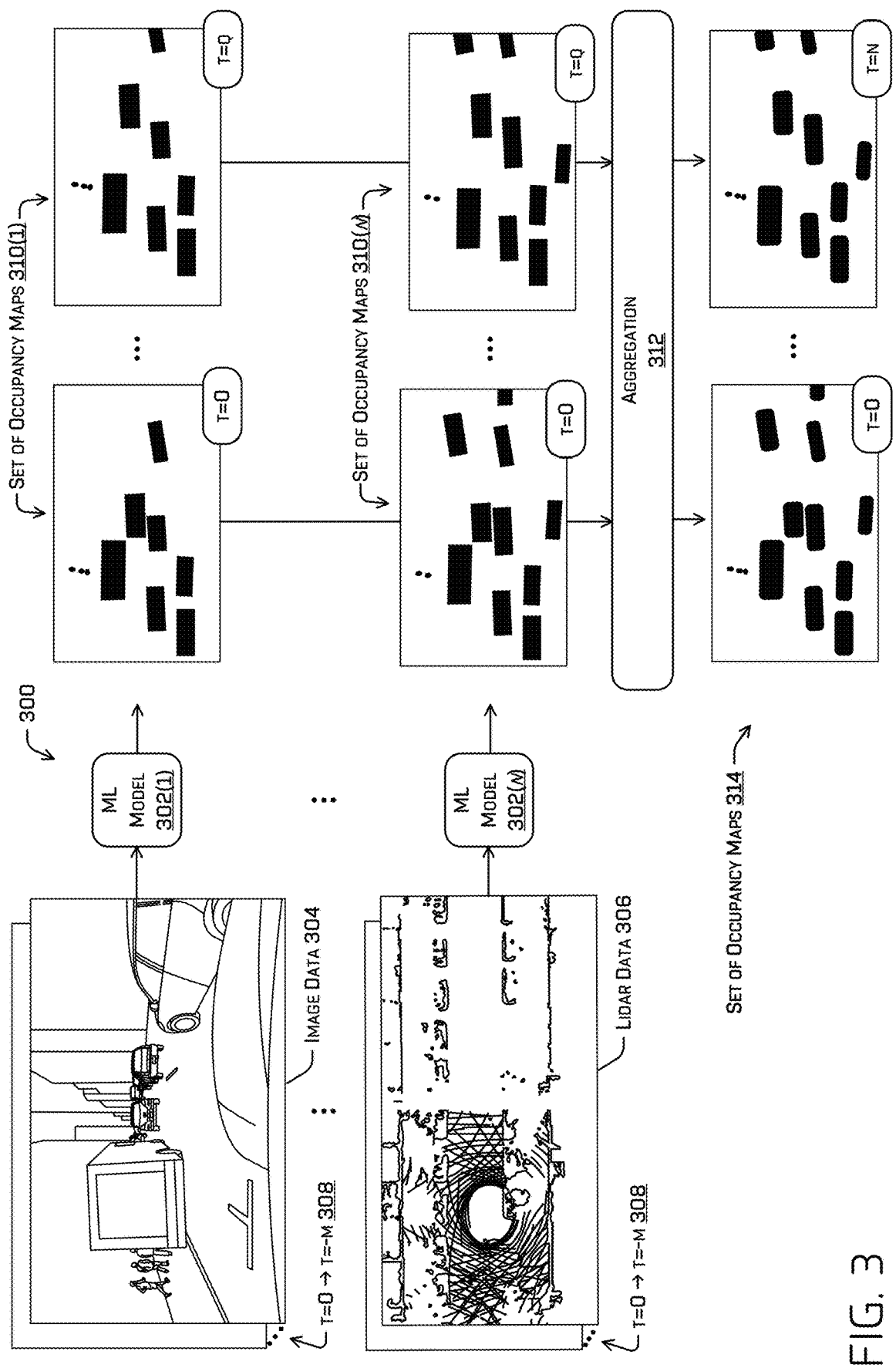
FIG. 3 illustrates a block diagram of at least part of an example collision avoidance component.

FIG. 3 illustrates an example architecture 300 of at least part of a collision avoidance component. In some examples, example architecture 300 may comprise ML model(s) 302(1)-(n), where n is a positive integer. In some examples, the number ML model(s) 302(1)-(n) may correspond to a number of sensor types associated with the received sensor data and the ML model(s) 302(1)-(n) may be trained to receive different types of sensor data as input. For example, a first ML model 302(1) may be trained to generate an output based on visible light image data 304, whereas an n-th ML model 302(n) may be trained to generate an output based on lidar data 306. Additional or alternate ML models maybe trained to generate outputs based at least in part on sensor data associated with additional or alternative sensor types, such as radar returns (e.g., which may be identified in a point cloud), thermal images (e.g., infrared images), sonar data, and/or the like. Of course, in some examples, one or more modalities may be input into a single ML model (e.g., any one or more of lidar, radar, or camera data may be input into a single model in any one or more formats (raw, top-down, etc.)). In some examples, the sensor data provided as input the ML model(s) 302(1)-(n) may be associated with a most-recent time (i.e., t=0) and/or one or more previous times. For example, the sensor data may range from a most-recent time to a time, −m, in the past, as depicted in FIG. 3 at 308. In any of the examples above, the sensor data used in such a system may be the same, a subset of, or different from the sensor data used with respect to the perception and prediction operations (as described herein). In additional or alternate examples, although ML models are depicted in FIG. 3 and discussed herein, it is understood that additional or alternate algorithms may be used.

In some examples, the ML model(s) 302(1)-(n) may each be trained to output a set of occupancy maps 310(1)-(n), respectively. A set of occupancy maps 310(n) may comprise one or more occupancy maps. In some examples, the set of occupancy maps 310(n) may comprise at least an occupancy map associated with a most-recent time at which sensor data was received or a future time after the most-recent time, either of which may be referred to as a current occupancy map. In an additional or alternate example, the set of occupancy maps 310(n) may comprise an occupancy map associated with future time, q (a positive number), and/or one or more occupancy maps from a most-recent time up until the future time. For example, the occupancy maps generated by an ML model may comprise occupancy maps associated with a current (most-recent or just after recent) time up until a q-th time at intervals for example, five occupancy maps from t=0 seconds to t=2 seconds at intervals of 500 milliseconds. In some examples, the ML model(s) 302(1)-(n) may be trained to output a same number of occupancy maps associated with same times, respectively.

An occupancy map may be a data structure that indicates whether a portion of the environment is occupied or unoccupied, whether an occupied portion is static or dynamic, and/or a confidence score (e.g., a likelihood/posterior probability that the portion is occupied/unoccupied). In at least one example, an occupancy map may comprise a field of confidence scores, although FIG. 3 depicts the occupancy maps as binarily indicating that occupied portions of the environment in black and unoccupied portions of the environment in white. For example, different pixels of an occupancy maps may be associated with different portions of the environment and each pixel may indicate a confidence score indicating a likelihood that the respective portion of the environment occupied/unoccupied.

In some examples, a discrete portion of the data structure may be associated with a portion of the environment. The discrete portion may be, for example, a pixel, a location in memory, and/or the like. The occupancy maps generated by an ML model and/or the occupancy maps generated by different models may comprise a same frame of reference, such that a same discrete portion (e.g., a same pixel location, a same respective memory location) of two different occupancy maps may correspond to a same portion of the environment. In some examples, this occupancy map alignment may be learned—the sensor data need not be pre-aligned, although, in some instances, it may be. To give an example, the occupancy maps may all be associated with a same 30 meter by 30 meter region of the environment centered on the autonomous vehicle. In additional or alternate examples, the occupancy maps may be aligned as a post-processing step after they have been generated by the ML model(s) 302(1)-(n).

In some examples, the sets of occupancy maps 310 generated by different ML models may be aggregated, by an aggregation component 312, into a single data structure, which may comprise a set of occupancy maps 314. The aggregation component 312 may determine a final estimation of whether a portion of the environment is occupied or unoccupied and/or dynamic or static (at a particular time) based at least in part on the occupancy maps associated with that same time, from among the different sets of occupancy maps 314. For example, the occupancy maps associated with t=0 may be aggregated into a single occupancy map, the occupancy maps associated with t=0.5 may be aggregated into a single occupancy map, and so on up until t=q.

In some examples, the set of occupancy maps 314 may comprise a binary indication that a portion of the environment is occupied or unoccupied. In another example, the set of occupancy maps 314 may additionally or alternatively comprise a confidence score. The aggregation component 312 may aggregate the set(s) of occupancy maps 310(1)-(n) based at least in part on a voting and/or averaging technique between occupancy maps associated with a same time, according to any of the techniques discussed herein.

In some examples, a threshold may be applied to the set of occupancy maps 314, e.g., after aggregation) or to the set(s) of occupancy maps 310(1)-(n), e.g., before aggregation. For example, applying a threshold to an occupancy map may comprise determining to associate a portion of the occupancy map with an indication that the portion of the environment associated therewith is occupied based at least in part on determining that a confidence score associated with the occupancy map portion meets or exceeds a confidence threshold. Contrarily, the portion of the occupancy map may be associated with an indication that the portion of the environment is unoccupied based at least in part on determining that the confidence score is less than the confidence threshold.

In an example where the threshold is applied to the set(s) of occupancy maps 310(1)-(n) before aggregation, the set of occupancy maps 314 that result from the aggregation may comprise binary indications that respective portions of the environment are occupied or unoccupied. In some examples, an aggregated confidence score may additionally be associated with a binary indication. In some instances, different ones of the ML model(s) 302(1)-(n) may be associated with different confidence thresholds based at least in part on the different sensor types associated therewith.

In another example where the threshold is not applied before aggregation, the set of occupancy maps 314 that result from aggregation may comprise a field of confidence scores and applying the threshold to the confidence scores may result in binary indications of occupied and unoccupied portions of the environment. In some examples, applying the threshold may be part of the aggregating (e.g., it may be part of a voting and/or averaging technique).

In some examples, a value of the confidence score threshold may be set based at least in part on a target false positive and/or target false negative rate. The confidence score threshold may be set based at least in part on running the ML model(s) 302(1)-(n) on test sensor data.

EXAMPLE PROCESS

Figure 4:
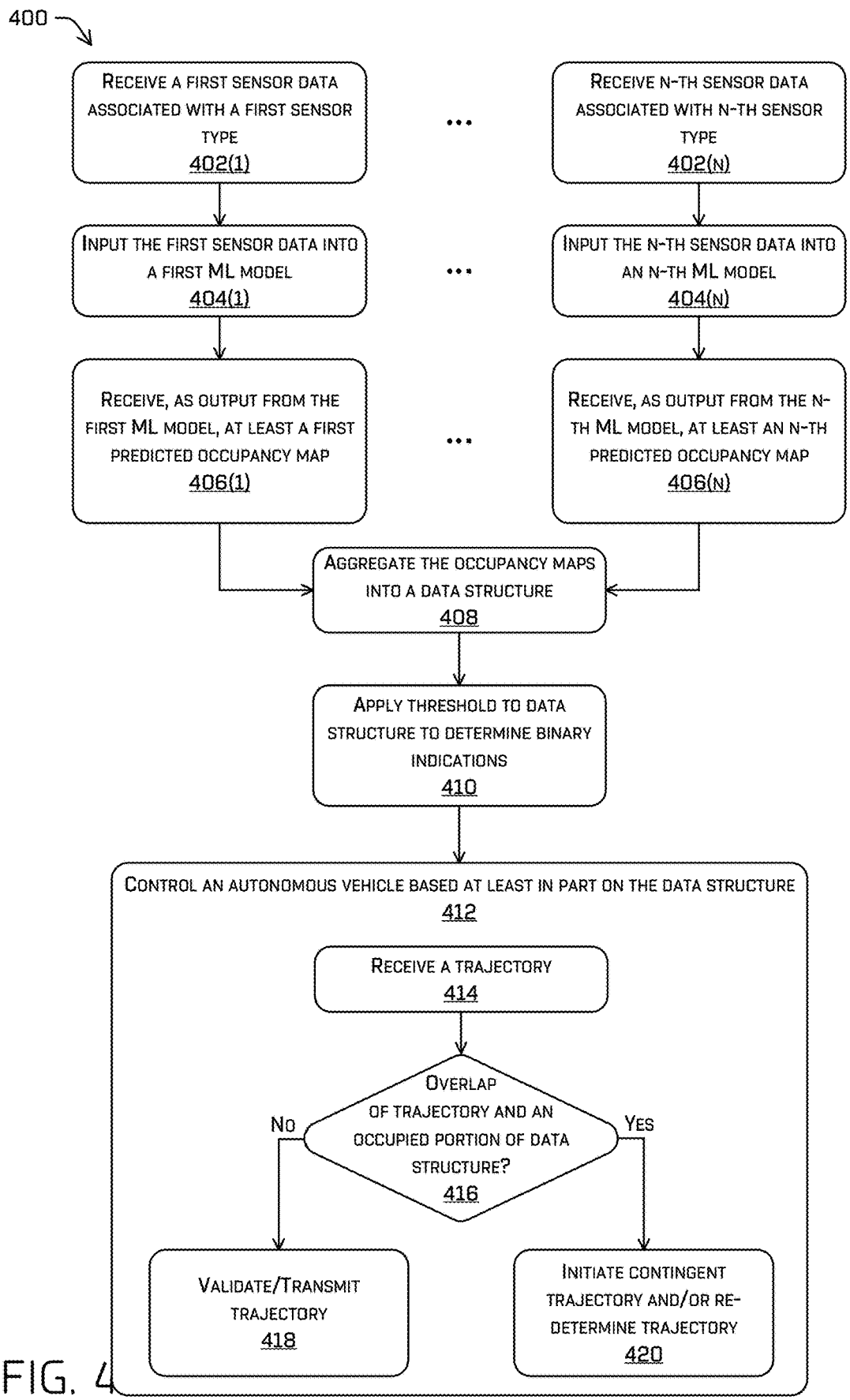
FIG. 4 illustrates a pictorial flow diagram of an example process performed by a using the collision avoidance component for validating a trajectory and/or implementing a contingent trajectory.

FIG. 4 illustrates a pictorial flow diagram of an example process 400 for validating a trajectory output by a planning component of an autonomous vehicle. In some examples, example process 400 may be executed by at least a collision avoidance component during operation of an autonomous vehicle.

Operations 402-406 may be executed by different processing pipelines. For example, there may be n processing pipelines, where n is a positive integer which may correspond to a number of sensor data types used by the collision avoidance system. An individual processing pipeline may comprise an ML model and/or other algorithm(s) for determining a set of occupancy maps as discussed herein. The ML model may be trained independently from ML model(s) of other pipeline(s). For the sake of clarity, the reference numbers for operation 402-406 leave off the parenthetical numerals that appear in the figures since operations 402-406 may be executed by at least a single pipeline.

At operation 402, example process 400 may comprise receiving sensor data associated with a sensor type, according to any of the techniques discussed herein. For example, the sensor data may comprise LIDAR data, radar data, infrared image data, visual image data, sonar data, and/or the like. In some examples, different pipelines may receive different types of sensors data. A first pipeline may receive lidar data, an n-th pipeline may receive radar data, and so on. It is understood that an ML model may be trained to receive a single data type or multiple data types, in an additional or alternate example.

At operation 404, example process 400 may comprise inputting the sensor data into an ML model, according to any of the techniques discussed herein. In some examples, operation 404 may additionally or alternatively comprise pre-processing the sensor data to remove sensor data outside a region that the collision avoidance system monitors, projecting the sensor data into a reference frame in common with sensor data of a different type, normalizing a density of the sensor data, removing sensor data above a threshold elevation, and/or the like.

At operation 406, example process 400 may comprise receiving, as output from the ML model, at least a predicted occupancy map, according to any of the techniques discussed herein. The predicted occupancy map may include a portion that indicates a likelihood that a portion of the environment is/isn't occupied at a future time. In some examples, operation 406 may additionally or alternatively comprise receiving one or more additional occupancy maps. For example, the additional occupancy maps may be associated with times at intervals from the future time until a most-recent time at which sensor data was received (e.g., at intervals from 2 seconds until 0 seconds). The additional occupancy maps may comprise a current map, which may be associated with a most-recent time at which sensor data was received, or a time subsequent thereto (e.g., 250 milliseconds thereafter, 500 milliseconds thereafter).

FIG. 5A depicts example occupancy maps 500-504, each of which may be associated with a same future time, q, and may have been received from different pipelines. For example, occupancy map 500 may have been received from a first pipeline, occupancy map 502 may have been received from a second pipeline, and occupancy map 504 may have been received from an n-th pipeline. Occupancy maps 506-510 are examples of aggregated occupancy maps, pursuant to different aggregation techniques and/or thresholds. The occupancy maps 500-510 each comprise multiple portions depicted as squares and each portion is associated with a respective portion of an environment surrounding the vehicle. For example, each of the occupancy maps 500-510 comprise portion 512 and portion 514. Note that, for simplicity, although in practice the portions may be different memory locations or pixels, we refer to them as being a same portion by virtue of being located at a same relative location within the occupancy map or corresponding to a same portion of the environment.

FIG. 5A depicts the confidence scores as different shades of gray, where white indicates a confidence score below 0.39, light gray indicates a confidence score between 0.4 and 0.59, medium gray indicates a confidence score between 0.6 and 0.79, and dark gray indicates a confidence score between 0.8 and 1.0. It is understood that these scores are given for the sake of example only and the ranges of confidence scores are also exclusively for illustrative purposes—additional or alternate examples may comprise different types of scores (e.g., percentages, ratios) and/or different ranges. In other words, the white indicates a high likelihood that the portions of the environment associated therewith are unoccupied and the dark gray indicates a high likelihood that the portions of the environment associated therewith are occupied.

At operation 408, example process 400 may comprise aggregating the occupancy maps into a data structure, according to any of the techniques discussed herein. In some examples, the aggregating may comprise aggregating occupancy maps generated by different pipelines and associated with a same time into a single occupancy map. This may be repeated per time with which the different occupancy maps are associated. For example, operation 408 may comprise aggregating a first occupancy map output by a first ML model and associated with a first time and a second occupancy map output by a second ML model and associated with the first time into a first aggregated occupancy map, and so on for subsequent time steps for which occupancy maps are determined by the different pipelines. Ultimately, the aggregating combines occupancy maps from different pipelines and associated with a same time into a single occupancy map. The data structure may comprise these aggregated occupancy maps at different time steps.

In some examples, operation 408 may comprise an ensemble voting technique such as, for example, majority voting, plurality voting, weighted voting (e.g., where certain pipelines are attributed more votes, functionally) and/or an averaging technique such as simple averaging, weighted averaging, and/or the like. In other words, a first occupancy map may indicate that there is a 0.9 likelihood that a portion of the environment is occupied and a second occupancy map may indicate that there is a 0.8 likelihood that the portion is occupied. The techniques may comprise using the likelihoods in a voting technique to determine whether to indicate that the portion is occupied or unoccupied and/or averaging the likelihoods to associate an averaged likelihood therewith.

At operation 410, example process 400 may comprise applying a threshold to the data structure to determine binary indications of whether a portion is occupied or unoccupied, according to any of the techniques discussed herein. The threshold may be a threshold confidence score. The threshold may be different per pipeline in examples where the threshold is applied to occupancy maps before aggregating. In some examples, applying the threshold may comprise indicating that any portion of an occupancy map that indicates a confidence score below the threshold is unoccupied and any portion that meets or exceeds the threshold confidence score is occupied, or vice versa depending on the meaning of the score (e.g., where 0 indicates that the environment portion is occupied). In an additional or alternate example, different thresholds may be associated with different pipelines—a score that meets or exceeds 0.8 may indicate occupancy for a first pipeline, a score that meets or exceeds 0.7 may indicate occupancy for a second pipeline, and so on.

In some examples, operation 410 may be part of operation 408. For example, in an example where operation 408 comprises a unanimity voting technique and the threshold is 0.75, operation 410 may comprise indicating the portion in the example discussed above is occupied based on the first occupancy map and the second occupancy map both indicating a likelihood that meets or exceeds 0.75.

The threshold may be set and/or the voting technique may be chosen based at least in part on a target false negative rate and/or a target false positive rate. For example, a unanimous voting technique may result in lower false negative rate and a higher false positive rate, whereas a plurality voting technique may result in a higher false negative rate and a lower false positive rate. Similarly, a higher threshold may result in a lower false negative rate and a higher false positive rate, and vice versa for a lower threshold. In some examples, setting a threshold may comprise training the ML models based at least in part on a training data set, which may include sensor data recorded from live operation of a vehicle and/or simulated sensor data, top-down representations generated by a previously-trained ML model, aerial footage, and/or labels generated by humans and/or another ML model; and/or operating the ML models using test data, which may comprise additional sensor data, at different thresholds. False positive and/or false negative rates may be determined for the testing, e.g., by human labeling and/or another verification process (e.g., differences from ground truth data) in association with the different thresholds. A threshold may be chosen that is associated with a target false positive and/or target false negative rate.

FIG. 5B illustrates an example occupancy map 506 that may result from setting a threshold and/or choosing a voting technique to achieve a conservative (low) false negative rate, which may result in a higher false positive rate. As a result, portion 512 and portion 514 may both indicate that the respective portions of the environment are occupied. Portion 512 illustrates just how conservative this indication is since only portion 512 of occupancy map 502 makes any indication that there could be an object located at the portion of the environment associated with portion 512 and, even then, the confidence is low, as indicated by the light gray. In some examples, the collision avoidance system may be designed to maximize safety and may use a threshold and/or voting technique to aggregate the occupancy maps to achieve a false negative conservative occupancy map.

FIG. 5C illustrates an example occupancy map 508 that may result from setting a threshold and/or choosing a voting technique to achieve a balance between a false negative rate and a false positive rate. This may be achieved by decreasing the threshold, choosing a less stringent voting technique, and/or weighting some of the occupancy maps output by more accurate ML models more heavily. Notice that portion 512 now indicates that the respective portion of the environment associated therewith is unoccupied while portion 514 indicates that the respective portion of the environment is occupied (e.g., since occupancy map 502 and occupancy map 504 both indicate that portion 514 is occupied). Setting the threshold and/or choosing the false negative rate to achieve a balanced occupancy map may balance safety interests with preventing the vehicle from hard-braking because of a false positive.

FIG. 5D illustrates an example occupancy map 510 that may result from setting a threshold and/or choosing a voting technique to achieve a conservative (low) false positive rate. This may be achieved by decreasing the threshold even further, choosing a less stringent voting technique, and/or weighting some of the occupancy maps output by more accurate ML models more heavily. Note that an increased threshold confidence may exclude portion 514 of occupancy map 502 and/or occupancy map 504 from indicating occupation. Portion 514 of occupancy map 510 may accordingly indicate that the portion of the environment associated therewith is unoccupied.

At operation 412, example process 400 may comprise controlling an autonomous vehicle based at least in part on the data structure, according to any of the techniques discussed herein. The data structure may comprise the aggregated occupancy maps discussed herein (at each of their respective time steps). Operation 412 may comprise operations 414, 416, 418, and/or 420.

At operation 414, example process 400 may comprise receiving a trajectory, according to any of the techniques discussed herein. For example, the trajectory may be received from a planning component of the autonomous vehicle. The trajectory may indicate a current and/or target position, velocity, acceleration, heading, steering angle, and/or steering rate.

At operation 416, example process 400 may comprise determining whether the trajectory is within a threshold distance of an occupied portion of the data structure, according to any of the techniques discussed herein. The threshold distance may be a buffer distance for safety that is based at least in part on a current and/or target velocity. Operation 416 may comprise determining whether the trajectory is associated with a position that is less than the threshold distance of an occupied portion indicated by any of the aggregated occupancy maps making up the data structure. In other words, operation 416 may comprise determining whether the trajectory will put the autonomous vehicle within the threshold distance of a portion of the environment predicted as being occupied at any of the respective times by the respective occupancy maps associated therewith. If, at operation 416, the collision avoidance system determines the trajectory is not associated with a position that is less than the threshold distance from an occupied portion (i.e., the positions are at a distance from any occupied portions that meets or exceeds the threshold distance), example process 400 may continue to operation 418; otherwise, example process 400 may continue to operation 420.

In an additional or alternate example, operation 416 may comprise summing probabilities associated with respective portions of the data structure associated with the trajectory and/or determining whether the summed probabilities meet or exceed a threshold score. The threshold score may be based at least in part on a velocity and/or length associated with the trajectory (e.g., as the trajectory velocity and/or length increases, the threshold may increase). Operation 416 may comprise determining a subset of portions of the data structure that the trajectory intersects and/or that are a threshold distance of the trajectory. The threshold distance may be based at least in part on a current velocity of the vehicle and/or a velocity associated with the trajectory. Summing the probabilities may comprise summing probabilities associated with the subset of portions of the data structure.

At operation 418, example process 400 may comprise validating and/or transmitting the trajectory, according to any of the techniques discussed herein. For example, validating and/or transmitting the trajectory may comprise causing the autonomous vehicle to execute the trajectory (e.g., by transmitting the trajectory to system controller(s)).

At operation 420, example process 400 may comprise initiating a contingent trajectory and/or re-determining a trajectory, according to any of the techniques discussed herein. For example, operation 420 may comprise causing the vehicle to execute a contingent trajectory, which may comprise transmitting instructions to a system controller to cause the vehicle to slow down, execute a safe-stop maneuver, hard-brake, and/or the like. In some examples, the planning component may determine the contingent trajectory and transmit the contingent trajectory to the collision avoidance component with the trajectory and/or upon request by the collision avoidance component. In an additional or alternate example, operation 420 may comprise transmitting a request to the planning component to determine a new trajectory.

EXAMPLE CLAUSES

A. A system comprising: two or more sensors; one or more processors; and a memory storing processor-executable instructions that, when executed by the one or more processors, cause the system to perform operations comprising: receiving first sensor data associated with a first sensor type associated with at least one of the two or more sensors; receiving second sensor data associated with a second sensor type associated with at least one of the two or more sensors; determining, based at least in part on the first sensor data, a first current occupancy map and a first predicted occupancy map, the first predicted occupancy map comprising a discretized grid indicative of likelihoods that respective portions thereof are occupied; determining, based at least in part on the second sensor data, a second current occupancy map and a second predicted occupancy map, wherein: the first current occupancy map and the second current occupancy map indicate a first likelihood and a second likelihood that a portion of an environment is occupied at a current time; and the first predicted occupancy map and the second predicted occupancy map indicate a third likelihood and a fourth likelihood that the portion of the environment is occupied at a future time; combining the first current occupancy map and the second current occupancy map into a data structure indicating whether the portion of the environment is occupied or unoccupied at the current time; combining the first predicted occupancy map and the second predicted occupancy map into the data structure indicating whether the portion of the environment is occupied or unoccupied at the future time; and controlling an autonomous vehicle based at least in part on the data structure.

B. The system of paragraph A, wherein the operations further comprise: determining, based at least in part on the data structure, at least one of a first position or a first velocity associated with at least a closest object; and receiving a trajectory, wherein controlling the autonomous vehicle further comprises determining, based at least in part on at least one of the first position or the first velocity and at least one of a second position or a second velocity associated with the autonomous vehicle to: control the autonomous vehicle to perform the trajectory, or control the autonomous vehicle to perform a contingent trajectory.

C. The system of paragraph B, wherein controlling the autonomous vehicle to perform a contingent trajectory is based at least in part on at least one of determining that the trajectory is within a threshold distance of at least one portion of the data structure indicated as being occupied or determining a sum of probabilities of portions of the data structure based at least in part on the trajectory.

D. The system of any one of paragraphs A-C, wherein: determining the first occupancy map comprises providing the first sensor data as input to a first machine-learned (ML) model and receiving the first occupancy map as output from the first ML model; and determining the second occupancy map comprises providing the second sensor data as input to a second machine-learned (ML) model and receiving the second occupancy map as output from the second ML model.

E. The system of any one of paragraphs A-D, wherein: the first current occupancy map comprises a first confidence score associated with the portion of the environment, the first confidence score indicating a first likelihood that the portion is occupied; the second current occupancy map comprises a second confidence score associated with the portion of the environment, the second confidence score indicating a second likelihood that the portion is occupied; and combining the first current occupancy map and the second current occupancy map into the data structure is based at least in part on at least one of the first confidence score, the second confidence score, the first sensor type, or the second sensor type.

F. The system of any one of paragraphs A-E, wherein the operations further comprise: associating a first portion of the first current occupancy map as indicating the portion is occupied based at least in part on determining that the first confidence score meets or exceeds a threshold confidence; and wherein combining the first current occupancy map and the second current occupancy map into the data structure further comprises voting based at least in part on the first portion and at least one of a second portion associated with the second current occupancy map indicating that the portion is occupied or unoccupied.

G. A method comprising: receiving first sensor data associated with a first sensor type; receiving second sensor data associated with a second sensor type; determining, based at least in part on the first sensor data, a first occupancy map wherein the first occupancy map indicates whether a portion of an environment surrounding an autonomous vehicle is occupied or unoccupied at a future time determining, based at least in part on the second sensor data, a second occupancy map, wherein the second occupancy map indicates whether the portion is occupied or unoccupied at the future time; combining the first occupancy map and the second occupancy map into a data structure based at least in part on the first occupancy map and the second occupancy map, wherein the data structure indicates whether the portion of the environment is occupied or unoccupied at the future time; and controlling the autonomous vehicle based at least in part on the data structure.

H. The method of paragraph G, further comprising: determining, based at least in part on the data structure, at least one of a first position or a first velocity associated with at least a closest object; and receiving a trajectory, wherein controlling the autonomous vehicle further comprises determining, based at least in part on at least one of the first position or the first velocity and at least one of a second position or a second velocity associated with the autonomous vehicle to: control the autonomous vehicle to perform the trajectory, or control the autonomous vehicle to perform a contingent trajectory.

I. The method of paragraph H, wherein controlling the autonomous vehicle to perform the contingent trajectory is based at least in part on one or more of determining that the trajectory is within a threshold distance of at least one portion of the data structure indicated as being occupied or determining a sum of probabilities associated with the data structure based at least in part on the trajectory.

J. The method of any one of paragraphs G-I, wherein: determining the first occupancy map comprises providing the first sensor data as input to a first machine-learned (ML) model and receiving the first occupancy map as output from the first ML model; and determining the second occupancy map comprises providing the second sensor data as input to a second machine-learned (ML) model and receiving the second occupancy map as output from the second ML model.

K. The method of any one of paragraphs G-J, wherein: the first current occupancy map comprises a first confidence score associated with the portion of the environment, the first confidence score indicating a first likelihood that the portion is occupied; the second current occupancy map comprises a second confidence score associated with the portion of the environment, the second confidence score indicating a second likelihood that the portion is occupied; and aggregating the first current occupancy map and the second current occupancy map into the data structure comprises associating a first portion of the first current occupancy map as indicating the portion is occupied based at least in part on determining that the first confidence score meets or exceeds a threshold confidence.

L. The method of any one of paragraphs G-K, wherein aggregating the first current occupancy map and the second current occupancy map into the data structure further comprises voting to associate a second portion of the data structure as indicating that the portion is occupied based at least in part on the first portion and at least one of a second portion associated with the second current occupancy map indicating that the portion is occupied or unoccupied, the first sensor type, the second sensor type, the first confidence score, or the second confidence score.

M. The method of any one of paragraphs G-L, wherein: the first sensor data and the second sensor data comprises current sensor data and previous sensor data; and the first occupancy map comprises at least a current occupancy map associated with a current time and a predicted occupancy map associated with a future time.

N. A non-transitory computer-readable medium storing processor-executable instructions that, when executed by one or more processors, cause the one or more processors to perform operations comprising: receiving first sensor data from one or more first sensors associated with a vehicle, the one or more first sensors being a first sensor type; receiving second sensor data from one or more second sensors associated with a vehicle, the one or more second sensors being a second sensor type; determining, based at least in part on the first sensor data, a first occupancy map indicating whether a portion of an environment surrounding the vehicle is occupied or unoccupied at a future time; determining, based at least in part on the second sensor data, a second occupancy map indicating whether the portion of the environment surrounding the vehicle is occupied or unoccupied at the future time; aggregating the first occupancy map and the second occupancy map into a data structure based at least in part on the first occupancy map and the second occupancy map, wherein the data structure indicates whether the portion of the environment is occupied or unoccupied at the future time; and controlling the autonomous vehicle based at least in part on the data structure.

O. The non-transitory computer-readable medium of paragraph N, wherein the operations further comprise: determining, based at least in part on the data structure, at least one of a first position or a first velocity associated with at least a closest object; and receiving a trajectory, wherein controlling the autonomous vehicle further comprises determining, based at least in part on at least one of the first position or the first velocity and at least one of a second position or a second velocity associated with the autonomous vehicle to: control the autonomous vehicle to perform the trajectory, or control the autonomous vehicle to perform a contingent trajectory.

P. The non-transitory computer-readable medium of paragraph O, wherein controlling the autonomous vehicle to perform the contingent trajectory is based at least in part on at least one of determining that the trajectory is within a threshold distance of at least one portion of the data structure indicated as being occupied or determining a sum of probabilities associated with the data structure based at least in part on the trajectory.

Q. The non-transitory computer-readable medium of paragraph P, wherein: determining the first occupancy map comprises providing the first sensor data as input to a first machine-learned (ML) model and receiving the first occupancy map as output from the first ML model; and determining the second occupancy map comprises providing the second sensor data as input to a second machine-learned (ML) model and receiving the second occupancy map as output from the second ML model.

R. The non-transitory computer-readable medium of any one of paragraphs N-Q, wherein: the first occupancy map comprises a first confidence score associated with the portion of the environment, the first confidence score indicating a first likelihood that the portion is occupied; the second occupancy map comprises a second confidence score associated with the portion of the environment, the second confidence score indicating a second likelihood that the portion is occupied; and aggregating the first occupancy map and the second occupancy map into the data structure comprises associating a first portion of the first occupancy map as indicating the portion is occupied based at least in part on determining that the first confidence score meets or exceeds a threshold confidence.

S. The non-transitory computer-readable medium of any one of paragraphs N-R, wherein aggregating the first occupancy map and the second occupancy map into the data structure further comprises voting to associate a second portion of the data structure as indicating that the portion is occupied based at least in part on the first portion and at least one of a second portion associated with the second occupancy map indicating that the portion is occupied or unoccupied, the first sensor type, the second sensor type, the first confidence score, or the second confidence score.

T. The non-transitory computer-readable medium of any one of paragraphs N-S, wherein: the first sensor data and the second sensor data comprises current sensor data and previous sensor data; and the first occupancy map comprises at least a current occupancy map associated with a current time and a predicted occupancy map associated with a future time.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
two or more sensors;
one or more processors; and
a memory storing processor-executable instructions that, when executed by the one or more processors, cause the system to perform operations comprising:
receiving first sensor data associated with a first sensor type associated with at least one of the two or more sensors;
receiving second sensor data associated with a second sensor type associated with at least one of the two or more sensors;
receiving a trajectory from a first vehicle system;
determining, based at least in part on the first sensor data and exclusive of the second sensor data, a first current occupancy map and a first predicted occupancy map, the first predicted occupancy map comprising a discretized grid indicative of likelihoods that respective portions thereof are occupied;
determining, based at least in part on the second sensor data and exclusive of the first sensor data, a second current occupancy map and a second predicted occupancy map, wherein:
the first current occupancy map and the second current occupancy map indicate a first likelihood and a second likelihood that a portion of an environment is occupied at a current time; and
the first predicted occupancy map and the second predicted occupancy map indicate a third likelihood and a fourth likelihood that the portion of the environment is occupied at a first future time;
combining the first current occupancy map and the second current occupancy map into a data structure indicating whether the portion of the environment is occupied or unoccupied at the current time;
combining the first predicted occupancy map and the second predicted occupancy map into the data structure indicating whether the portion of the environment is occupied or unoccupied at the first future time;
determining, by a second vehicle system and as a selected trajectory, whether to perform the trajectory or a contingent trajectory determined by the second vehicle system; and
controlling an autonomous vehicle based at least in part on the data structure to perform the selected trajectory.

2. The system of claim 1, wherein the operations further comprise:
determining, based at least in part on the data structure, at least one of a first position or a first velocity associated with at least a closest object; and
wherein controlling the autonomous vehicle further comprises determining, based at least in part on at least one of the first position or the first velocity and at least one of a second position or a second velocity associated with the autonomous vehicle to:
control the autonomous vehicle to perform the trajectory, or
control the autonomous vehicle to perform the contingent trajectory.

3. The system of claim 2, wherein controlling the autonomous vehicle to perform the contingent trajectory is based at least in part on at least one of determining that the trajectory is within a threshold distance of at least one portion of the data structure indicated as being occupied or determining a sum of probabilities of portions of the data structure based at least in part on the trajectory.

4. The system of claim 1, wherein:
the first current occupancy map comprises a first confidence score associated with the portion of the environment, the first confidence score indicating a first likelihood that the portion is occupied;
the second current occupancy map comprises a second confidence score associated with the portion of the environment, the second confidence score indicating a second likelihood that the portion is occupied; and
combining the first current occupancy map and the second current occupancy map into the data structure is based at least in part on at least one of the first confidence score, the second confidence score, the first sensor type, or the second sensor type.

5. The system of claim 4, wherein the operations further comprise:
associating a first portion of the first current occupancy map as indicating the portion is occupied based at least in part on determining that the first confidence score meets or exceeds a threshold confidence; and
wherein combining the first current occupancy map and the second current occupancy map into the data structure further comprises voting based at least in part on the first portion and at least one of a second portion associated with the second current occupancy map indicating that the portion is occupied or unoccupied.

6. A method comprising:
receiving first sensor data associated with a first sensor type;
receiving second sensor data associated with a second sensor type;
determining, based at least in part on the first sensor data, a first occupancy map wherein the first occupancy map indicates whether a portion of an environment surrounding an autonomous vehicle is occupied or unoccupied at a first future time;
determining, based at least in part on the second sensor data and exclusive of the first sensor data, a second occupancy map, wherein the second occupancy map indicates whether the portion is occupied or unoccupied at the first future time;
combining the first occupancy map and the second occupancy map into a data structure based at least in part on the first occupancy map and the second occupancy map, wherein the data structure indicates whether the portion of the environment is occupied or unoccupied at the first future time,
wherein the combining comprises associating a first portion of the data structure as indicating the first portion is occupied based at least in part on determining that a confidence score meets or exceeds a dynamic threshold confidence, and the dynamic threshold confidence is determined based at least in part on the first sensor type or the second sensor type;
receiving a trajectory from a first system that is based at least in part on data other than the first occupancy map and the second occupancy map;
determining, by a second system and as a selected trajectory, whether to perform the trajectory or a contingent trajectory; and
controlling the autonomous vehicle based at least in part on the data structure to perform the selected trajectory.

7. The method of claim 6, further comprising:
determining, based at least in part on the data structure, at least one of a first position or a first velocity associated with at least a closest object; and
wherein controlling the autonomous vehicle further comprises determining, based at least in part on at least one of the first position or the first velocity and at least one of a second position or a second velocity associated with the autonomous vehicle to:
control the autonomous vehicle to perform the trajectory, or
control the autonomous vehicle to perform the contingent trajectory.

8. The method of claim 7, wherein controlling the autonomous vehicle to perform the contingent trajectory is based at least in part on one or more of determining that the trajectory is within a threshold distance of at least one portion of the data structure indicated as being occupied or determining a sum of probabilities associated with the data structure based at least in part on the trajectory.

9. The method of claim 6, wherein:
determining the first occupancy map comprises providing the first sensor data as input to a first machine-learned (ML) model and receiving the first occupancy map as output from the first ML model; and
determining the second occupancy map comprises providing the second sensor data as input to a second machine-learned (ML) model and receiving the second occupancy map as output from the second ML model.

10. The method of claim 6, wherein:
the first occupancy map comprises a first confidence score associated with the portion of the environment, the first confidence score indicating a first likelihood that the portion is occupied;
the second occupancy map comprises a second confidence score associated with the portion of the environment, the second confidence score indicating a second likelihood that the portion is occupied; and
aggregating the first occupancy map and the second occupancy map into the data structure comprises associating a first portion of the first occupancy map as indicating the portion is occupied based at least in part on determining that the first confidence score meets or exceeds a threshold confidence.

11. The method of claim 10, wherein aggregating the first occupancy map and the second occupancy map into the data structure further comprises voting to associate a second portion of the data structure as indicating that the portion is occupied based at least in part on the first portion and at least one of a second portion associated with the second occupancy map indicating that the portion is occupied or unoccupied, the first sensor type, the second sensor type, the first confidence score, or the second confidence score.

12. The method of claim 6, wherein:
the first sensor data and the second sensor data comprises current sensor data and previous sensor data; and
the first occupancy map comprises at least a current occupancy map associated with a current time and a predicted occupancy map associated with the first future time.

13. A non-transitory computer-readable medium storing processor-executable instructions that, when executed by one or more processors, cause the one or more processors to perform operations comprising:
receiving first sensor data from one or more first sensors associated with a vehicle, the one or more first sensors being a first sensor type;
receiving second sensor data from one or more second sensors associated with the vehicle, the one or more second sensors being a second sensor type;

determining, based at least in part on the first sensor data, a first occupancy map indicating whether a portion of an environment surrounding the vehicle is occupied or unoccupied at a first future time;

determining, based at least in part on the second sensor data and exclusive of the first sensor data, a second occupancy map indicating whether the portion of the environment surrounding the vehicle is occupied or unoccupied at the first future time;

aggregating the first occupancy map and the second occupancy map into a data structure based at least in part on the first occupancy map and the second occupancy map, wherein the data structure indicates whether the portion of the environment is occupied or unoccupied at the first future time, wherein the aggregating comprises associating a first portion of the data structure as indicating the portion is occupied based at least in part on determining that a confidence score meets or exceeds a dynamic threshold confidence;

determining, as a selected trajectory, whether to perform a trajectory determined by a first system or a contingent trajectory determined by a second system; and controlling the vehicle based at least in part on the data structure to perform the selected trajectory.

14. The non-transitory computer-readable medium of claim 13, wherein the operations further comprise:

determining, based at least in part on the data structure, at least one of a first position or a first velocity associated with at least a closest object; and wherein controlling the vehicle further comprises determining, based at least in part on at least one of the first position or the first velocity and at least one of a second position or a second velocity associated with the vehicle to:

control the vehicle to perform the trajectory, or control the vehicle to perform the contingent trajectory.

15. The non-transitory computer-readable medium of claim 14, wherein controlling the vehicle to perform the contingent trajectory is based at least in part on at least one of determining that the trajectory is within a threshold distance of at least one portion of the data structure indicated as being occupied or determining a sum of probabilities associated with the data structure based at least in part on the trajectory.

16. The non-transitory computer-readable medium of claim 15, wherein:

determining the first occupancy map comprises providing the first sensor data as input to a first machine-learned (ML) model and receiving the first occupancy map as output from the first ML model; and determining the second occupancy map comprises providing the second sensor data as input to a second machine-learned (ML) model and receiving the second occupancy map as output from the second ML model.

17. The non-transitory computer-readable medium of claim 13, wherein:

the first occupancy map comprises a first confidence score associated with the portion of the environment, the first confidence score indicating a first likelihood that the portion is occupied;

the second occupancy map comprises a second confidence score associated with the portion of the environment, the second confidence score indicating a second likelihood that the portion is occupied; and aggregating the first occupancy map and the second occupancy map into the data structure comprises associating a first portion of the first occupancy map as indicating the portion is occupied based at least in part on determining that the first confidence score meets or exceeds a threshold confidence.

18. The non-transitory computer-readable medium of claim 17, wherein aggregating the first occupancy map and the second occupancy map into the data structure further comprises voting to associate a second portion of the data structure as indicating that the portion is occupied based at least in part on the first portion and at least one of a second portion associated with the second occupancy map indicating that the portion is occupied or unoccupied, the first sensor type, the second sensor type, the first confidence score, or the second confidence score.

19. The non-transitory computer-readable medium of claim 13, wherein:

the first sensor data and the second sensor data comprises current sensor data and previous sensor data; and the first occupancy map comprises at least a current occupancy map associated with a current time and a predicted occupancy map associated with the first future time.

20. The system of claim 1, wherein:

at least one of combining the first current occupancy map and the second current occupancy map or combining the first predicted occupancy map and the second predicted occupancy map comprises associating a first portion of the data structure as indicating the first portion is occupied based at least in part on determining that a confidence score meets or exceeds a dynamic threshold confidence; and the dynamic threshold confidence is based at least in part on at least one of a target false positive rate, a target false negative rate, or additional sensor data.

* * * * *